Nov. 16, 1943.   E. M. FISK   2,334,185
INTERNAL COMBUSTION ENGINE
Filed May 19, 1941   3 Sheets-Sheet 3
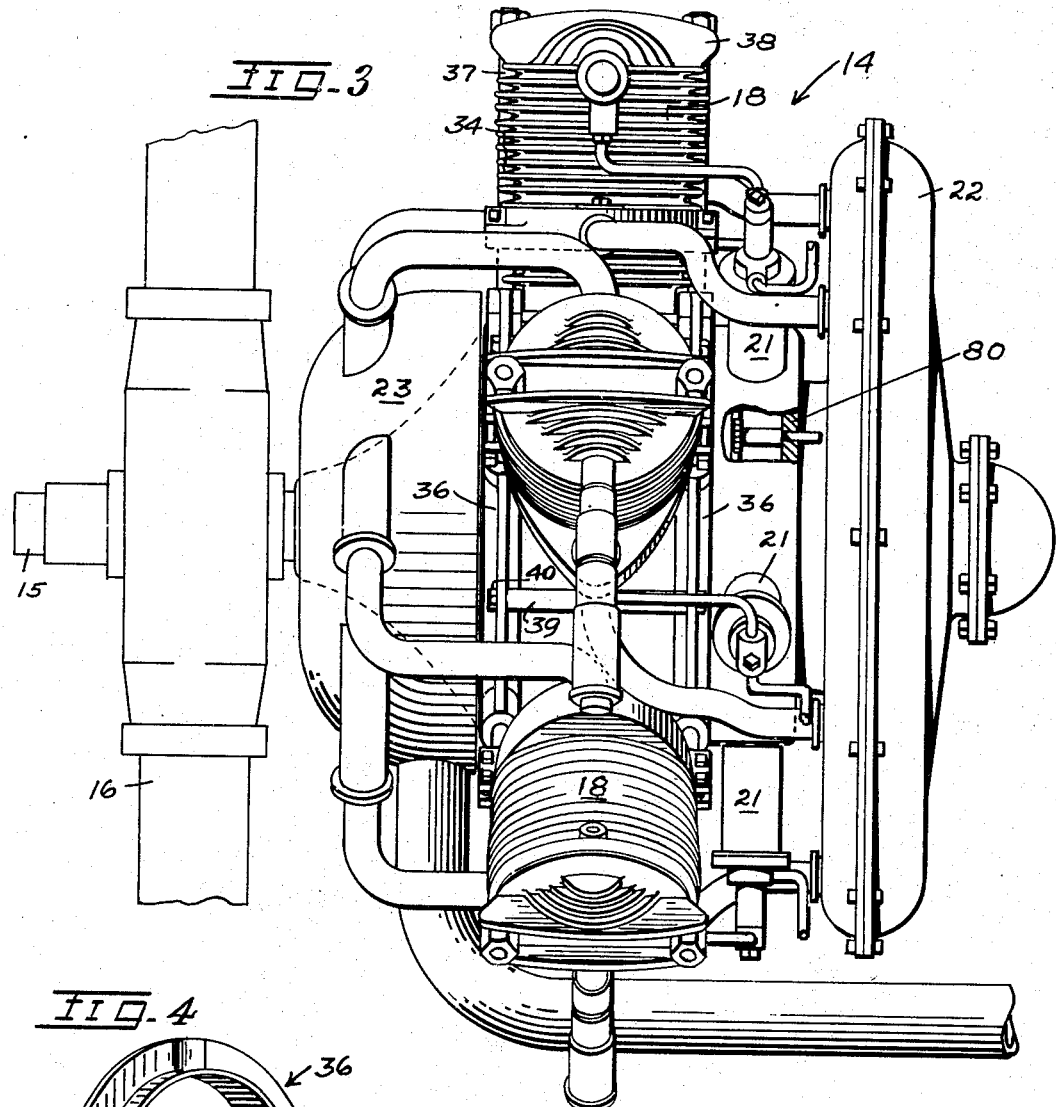
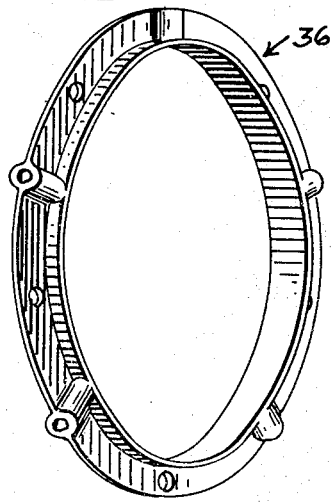
INVENTOR
EDWIN M. FISK
BY Henry N. Young
ATTORNEY Patented Nov. 16, 1943

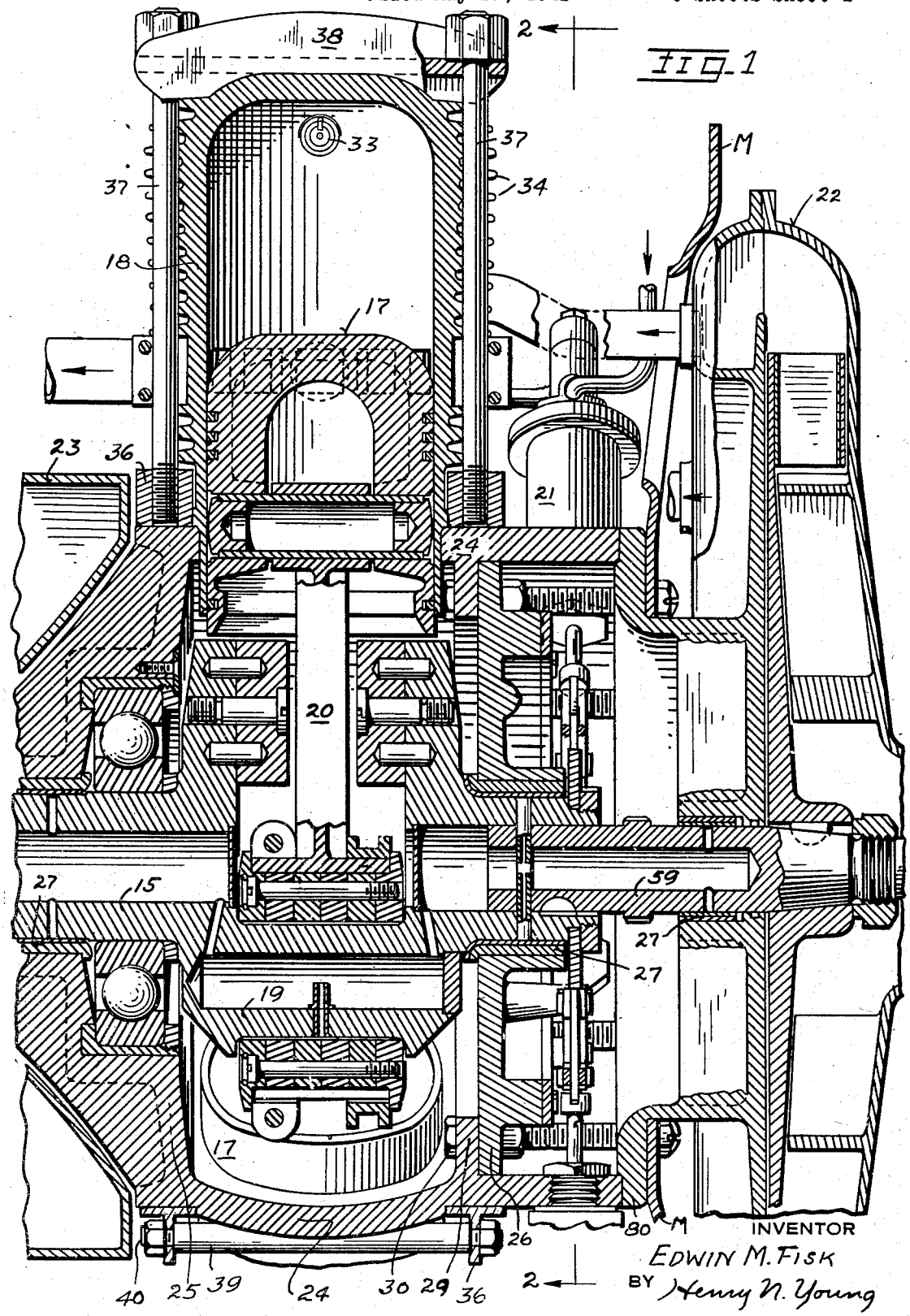

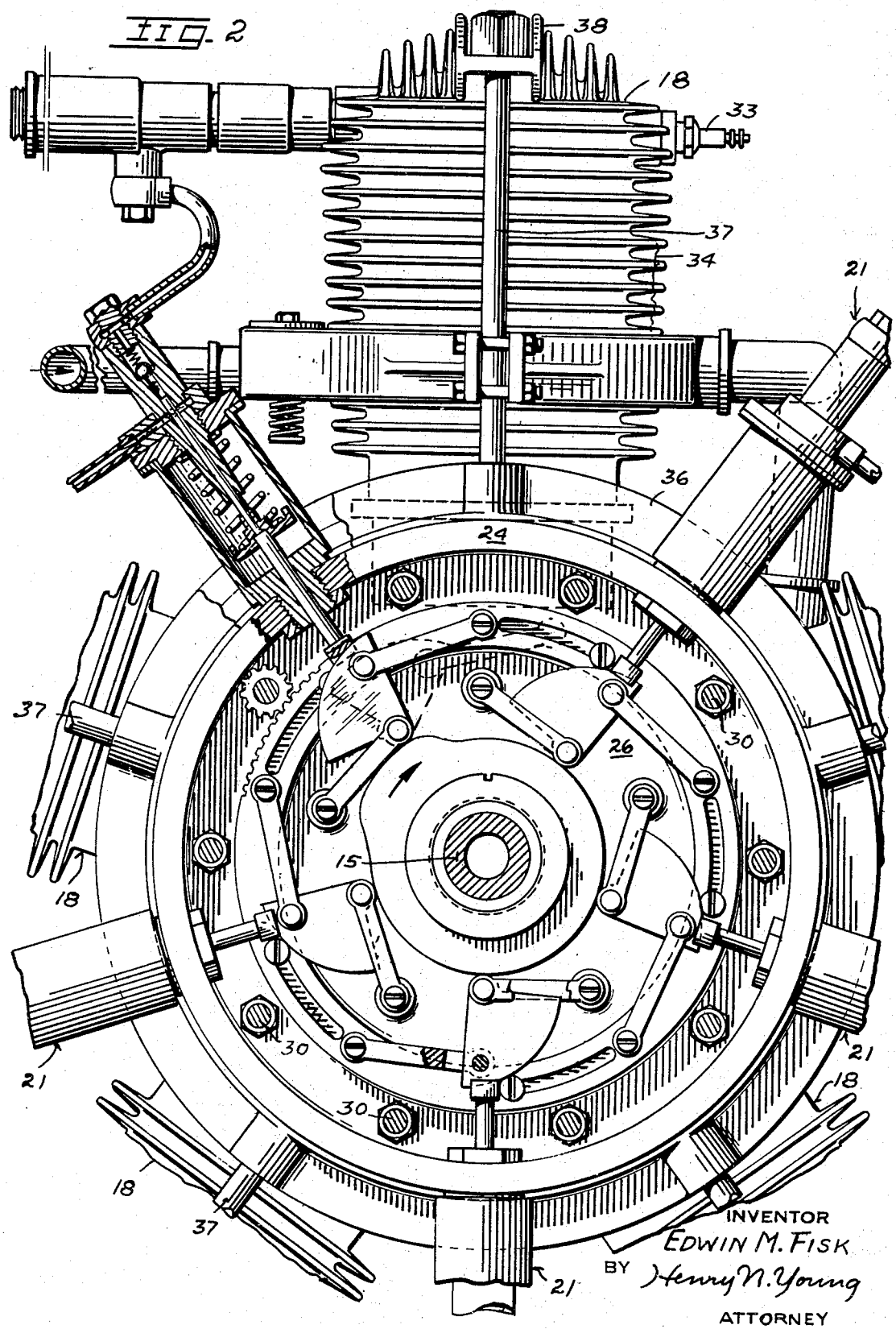

2,334,185

UNITED STATES PATENT OFFICE 2,334,185

INTERNAL COMBUSTION ENGINE

Edwin M. Fisk, Mission San Jose, Calif.

Application May 19, 1941, Serial No. 394,097

9 Claims. (Cl. 121—194)

The invention relates to radial engines of the internal combustion type.

A primary object of the invention is to provide an improved radial engine structure of minimized weight for its delivered power whereby it is particularly adapted for use in propelling aeronautical vehicles.

A more specific object is to provide an improved means for mounting the cylinders of the engine as separate and replaceable elements on a central structure providing the crankcase and shaft mounting of the engine.

The invention possesses other objects and features of invention, some of which, with the foregoing, will be set forth or be apparent in the following description of a typical embodiment thereof, and in the accompanying drawings, in which, Figure 1 is a fragmentary longitudinal section taken through a Diesel-cycle engine embodying the features of present invention.

Figure 2 is a fragmentary transverse sectional view of the engine taken at the line 2—2 in Figure 1.

Figure 3 is a reduced scale side elevation of the engine.

Figure 4 is a perspective view of a ring member which is used in dismountably mounting the cylinders on the central engine member providing the crankcase.

For purposes of illustration, the features of present invention are incorporated in the structure of a radial Diesel engine 14 which is particularly arranged for use in the propulsion of an aeronautic vehicle. A crankshaft 15 carries a propeller 16 and is arranged to be driven by pistons 17 operative in cylinders 18 which radiate from the crankshaft axis and are connected to the same throw offset or crankpin 19 of the shaft by connecting rods 20, the cylinders being disposed in a common plane perpendicular to the crankshaft axis. The crankpin may be counterbalanced by weighted shaft extensions extending from the opposite side of the shaft and spaced to permit the operation of the connecting rods 20 between them. The present engine assembly, being particularly a Diesel engine, includes individual fuel pumps 21 and an air compressor 22 for respectively supplying fuel and air to the cylinders, these elements being provided at the opposite end of the engine from the propeller 16. An exhaust manifold 23 is provided at the forward end of the engine and behind the propeller 16.

The crankcase assembly comprises a generally drum-shaped structure including a tabular peripheral wall 24 coaxial with the shaft axis, and forward and rear end walls 25 and 26 which mount the shaft in suitable anti-friction bearings 27 provided at axial openings therethrough. In the present structure, the wall 25 is integral with the peripheral wall 24 of the crankcase, and these walls are cooperative with the wall 26 to define the crankcase space in which the crankpin 19 of the shaft is operative. As particularly illustrated, a flange 29 extends radially inwardly from an intermediate point of the bore of the wall 24, and the wall 26 is fixed to said flange by means of bolts 30. At spaced points thereabout laterally of the zone of action of the crankpin, the peripheral crankcase wall 24 is provided with cylinder-receiving openings having their axes radial to the shaft axis, mutually coplanar, and equally spaced in their line, said openings being arranged to slidably and closely receive inner end portions of the cylinders 18.

It will now be noted that the cylinders 18 are alike, comprise separate and replaceable elements of the engine assembly and are so mounted and secured at the openings that the firing of fuel charges therein does not produce tensional strains radially of the engine on either the cylinder or crankcase structures. As particularly shown, the cylinders 18 comprise like one-piece structures provided with bores having more or less convex closed outer end portions. Electric ignition plugs 33 may be provided at said outer portions of the cylinder bores, this providing for the necessary ignition for a starting of the engine while cold. The head end of each piston 17 is appropriately shaped for cooperation with the opposed head end of the cylinder cavity to provide the required head clearance, to facilitate the scavenging of combustion products, and to effect a desirable turbulence of the supplied air to intimately mix it with the injected fuel. Externally thereof, each cylinder 18 is provided at its sides and head end with heat-radiating ribs or fins 34, the cylinders thereby being arranged for air cooling.

At a point thereof spaced slightly from its inner end, each cylinder 18 is provided with a radial flange which is operative to limit the distance of insertion of the cylinder within an opening in the crankcase wall 24. The inner faces of each flange and the opposed outer face portion of the wall 24 are mutually complementary to permit a sealed seating of the flange against the wall 24; as shown, said bearing faces are flat.

Ring members 36 are mounted on the crankcase wall 24 at opposite sides of the openings and provide suitably positioned threaded radial bores for receiving the inner extremities of bolts 37 which are arranged to secure the cylinders to the rings while the inner cylinder portions extend through the cylinder-receiving crankcase openings; the present rings 36 are of T section. As particularly illustrated, a yoke member 38 spans and bears against each cylinder at its head end, extends parallel to the engine axis, and receives a bolt 37 through each of its extremities whereby said bolts freely receive the cylinder between them; this arrangement facilitates a balanced tightening of the bolts which are operative as tension elements between the cylinder head and the rings 36 to seat and secure the cylinder at the cylinder-receiving openings with an adjustable degree of pressure. Since the rings 36 receive the crankcase wall 24 within their bores, a tightening of a pair of bolts 37 for a cylinder urges the cylinder inwardly to effect a sealed seating of its flange against the opposed seat on the wall 24 while tending to pull the opposite sides of the rings against said wall. The mounted rings 36 may be tied together in fixed spaced relation; as shown, spreader sleeves 39 engaged between the rings and passing between adjacent cylinders and axially of the engine receive tie bolts 40 which are engaged with and between the flange portions of the rings.

With all the cylinders fixed on the crankcase in the described manner, it is preferable that the bores of the rings snugly engage the crankcase whereby the inward bearing and sealing pressure of the cylinder against the crankcase may be assured. Under operating conditions, the reaction to a working stroke of a piston will tend to move its cylinder outwardly in the receiving casing opening to thereby, through the bolts 37, urge a pulling away of the rings from the wall 24 at the cylinder base while pulling the rings toward the wall at its diametrically opposite side to provide a positive bearing pressure of the rings thereat. Since each cylinder 18 is held against the crankcase only through the rings 36 and bolts 37 between the rings and other cylinders, their side walls are not subjected to any longitudinal tension by reason of a firing reaction, and the cylindrical crankcase is simultaneously subjected only to compressive forces, with the result that the present crankcase and cylinder structures do not receive the repeated tensile shocks which the crankcase and cylinders of an engine having its cylinders fixedly related to the crankcase must experience.

In view of the fact that neither the cylinders nor the crankcase of the present engine are subjected to appreciable tensile strains, these may be of lighter construction than for present engines in which tensile strains are set up upon the firing of charges in the cylinders. Thus the cylinder and crankcase walls of the present engine may be much thinner than usual; aluminum or magnesium alloys are strong enough in compression for use as the material of which the present crankcase is formed. The rings 36 and the bolts 37, being tension elements, would necessarily be of a more tensionally strong material such as steel and would have a certain degree of resilient flexibility in their planes which would more or less cushion the reaction shocks transmitted through them between the cylinders and the crankcase. It will be understood that the present device for providing a particularly light weight engine block assembly of cylinders and a crankcase is applicable to radial engine generally, and is therefore not to be considered as limited to a Diesel cycle engine.

To obtain the noted and other benefits of the described engine block assembly, it is, of course, necessary that the cylinders be fired singly rather than simultaneously, this being automatically effected for a two stroke cycle radial engine without regard to the number of cylinders, and being provided for in the design of a four stroke cycle radial explosion engine as by having an odd number of cylinders. With the disclosed engine having five cylinders, the firing of any cylinder will result in an increased inward and equal pressure against the crankcase of the ring portions opposite the fired cylinder and so distribute the reaction as compression of the crankcase.

An annular plate 80 closes the rear end of the crankcase wall 24, comprises the attaching means or base of the rotary air compressor 22, and is secured to the crankcase by the bolts 30. As indicated in Figure 1, the bolts 30 may also secure the engine to a mounting frame M therefor. A shaft extension 59 mounts the rotor for the compressor 22 and its forward end is splined and pinned within the axial bore of the shaft 15 which is tubular for minimizing the weight of the engine.

From the foregoing description taken in connection with the accompanying drawings, the advantages of the construction and operation of the present engine will be readily understood by those skilled in the art to which this invention appertains. While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In a radial engine, a cylindrical crankcase mounting structurally independent cylinders in radiating relation thereto, and means operative in tension directly between the head end of each cylinder and the opposite side of the crankcase from the cylinder to engage the cylinder and crankcase in mutual compression.

2. In a radial engine, a cylindrical crankcase provided with a line of cylinder openings peripherally thereabout, cylinders seated against the crankcase at said openings in centered relation thereto, a tension means directly connecting the head ends of said cylinders with the crankcase side opposite their openings as the sole means for seating the cylinders, and means of said tension means adjustable to adjust the operative tension thereof.

3. In a radial engine, a cylindrical crankcase provided with cylinder-receiving openings, cylinders seated against said crankcase and slidably extending into said openings, and a tension means connecting the head end of each said cylinder with the side of the crankcase opposite the opening which receives it and independently of the other cylinders for compressedly engaging the cylinder and crankcase.

4. In a radial engine, a cylindrical crankcase provided with cylinder-receiving openings, cylinders seated against said crankcase and slidably engaged in said openings, ring members freely encircling said crankcase at opposite sides of the cylinders, and a tension means connecting each said cylinder with said rings for compressedly seating the cylinders against the crankcase.

5. In a radial engine, a crankcase having its side wall provided with a peripheral line of cylinder openings, cylinders seated against said crankcase wall with their bores in alignment with said openings, an anchor ring encircling the crankcase at a common side of the cylinders, and bolts tensionally connecting the cylinders and ring to forcibly seat the corresponding sides of the cylinders against the crankcase wall, and a means operative as said anchor ring and bolts at the opposite side of the cylinders from said anchor ring.

6. In a radial engine, a crankcase having its peripheral wall provided with a plurality of cylinder-receiving openings radiating from the engine axis, cylinders slidably engaged in said openings and provided with external circumferential flanges for seating against the side wall at said openings to limit the distance of insertion of the cylinders in the openings, ring members encircling said crankcase at opposite sides of the cylinders, and tension bolts connecting the head end of each cylinder with the ring members whereby the cylinders are arranged to be held seated in longitudinal compression against the side wall.

7. In a radial engine, a crankcase provided with cylinder openings peripherally thereof, mutually independent cylinders seated against the exterior of said crankcase at said openings, ring members freely encircling said crankcase at opposite sides of the cylinders, and a tension means connecting each said cylinder with the different said rings for compressedly seating the cylinder against the crankcase.

8. In a radial engine, a crankcase provided with cylinder openings peripherally thereof, structurally independent cylinders seated against the exterior of said crankcase at said openings, ring members freely encircling said crankcase at opposite sides of the cylinders, a tension means connecting each said cylinder with the different said rings for compressedly seating the cylinder against the crankcase, and means to adjustably vary the tension of the connection provided by said tension means.

9. In a radial engine, a crankcase provided with cylinder openings peripherally thereof, structurally independent cylinders seated against the exterior of said crankcase in registration with said openings, ring members freely encircling said crankcase at opposite sides of the cylinders, a tension means connecting each said cylinder with the different said rings for compressedly seating the cylinder against the crankcase, and means spaced from the cylinders and crankcase operative to secure the rings in mutually fixed spaced relation.

EDWIN M. FISK.